R. E. BENSON.
TIRE GRIP CHAIN.
APPLICATION FILED JAN. 3, 1919.
1,414,396.
Patented May 2, 1922.
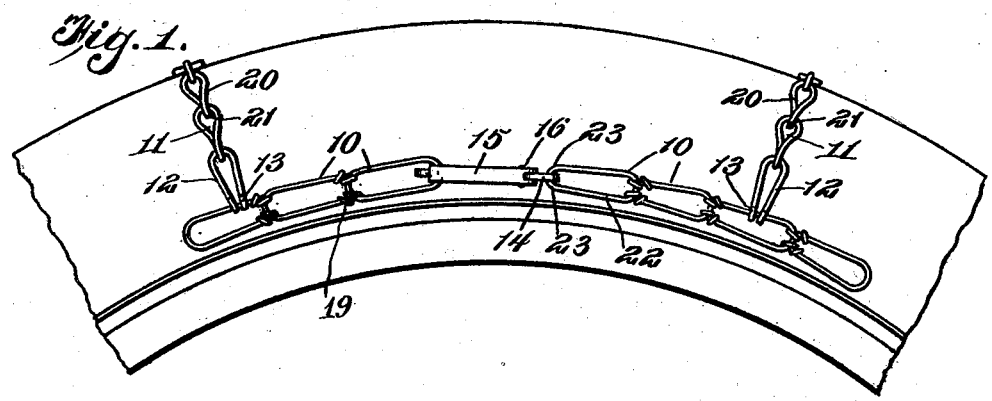
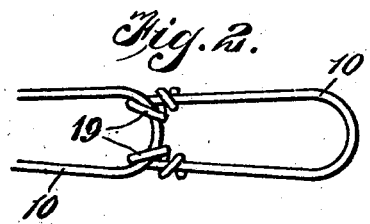
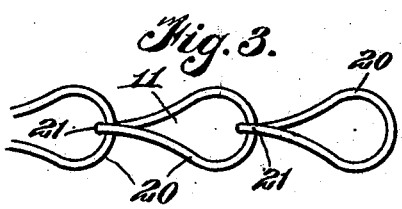
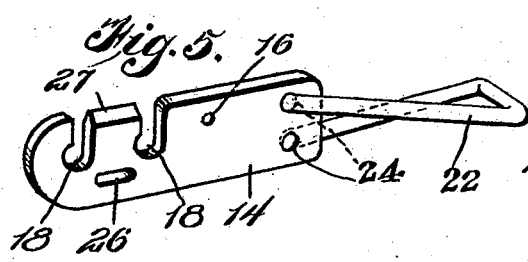
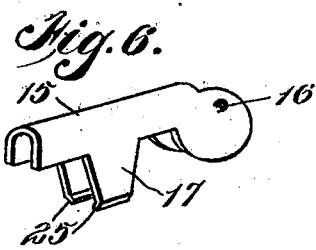
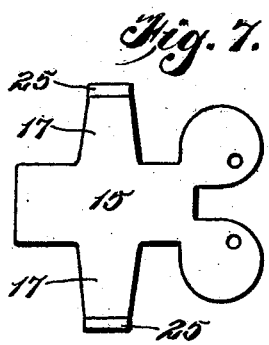
Inventor:
R. E. Benson,
By C. C. Hines,
Atty.

UNITED STATES PATENT OFFICE.

ROBERT E. BENSON, OF LODI, OHIO.

TIRE GRIP CHAIN.

1,414,396. Specification of Letters Patent. Patented May 2, 1922.

Application filed January 3, 1919. Serial No. 269,496.

*To all whom it may concern:*

Be it known that I, ROBERT E. BENSON, a citizen of the United States, residing at Lodi, in the county of Medina and State of Ohio, have invented new and useful Improvements in Tire Grip Chains, of which the following is a specification.

The object of the invention is to provide a simple, inexpensive and efficient tire chain designed as an anti-skid and traction increasing device, adaptable to tires of different types, sizes and diameters, capable of application with the minimum effort and the least expenditure of time on the part of the operator and having means by which accidental detachment or displacement may be prevented even under the most severe tests due to vibration of traversing rough roads.

Further objects and advantages will be indicated in the course of the following description of a preferred embodiment, it being understood that changes in form, proportion and details may be resorted to, within the scope of the appended claim, without departing from the spirit of the invention.

In the drawing,

Figure 1 is a fragmentary view of a chain constructed in accordance with the invention applied in the operative position to a wheel.

Figure 2 is a detail view of a portion of one of the side chains.

Figure 3 is a similar view of one of the transverse or tread chain sections.

Figure 4 is a detail view of an attaching link by means of which each extremity of a transverse or tread chain is connected with a side chain.

Figure 5 is a detail view of a clamp member adapted for connection with one of the side chains for engaging links at the free end of the same chain.

Figure 6 is a detail view of the safety clasp with which the clamp is provided to prevent accidental disengagement from the free end of the side chain.

Figure 7 is a plan view of the blank from which the clasp is formed.

Figure 8 is a detail view of the attaching loop by means of which the clamp is connected with one end of the side chain.

Essentially the device consists of side chains 10 comprising a plurality of relatively short links in order that it may have the required flexibility to adapt itself to the contour and diameter of the wheel tire to which it may be applied. The side chains are connected by transversely extending tread elements or chains 11 provided with terminal attaching links 12 which are formed with terminal hooks 13 at one end thereof to engage a link of a side chain. Each side chain is provided with a clamp 14 consisting of a plate permanently connected with one end of each side chain, by means hereinafter specifically described, and a safety clasp 15 which is pivotally mounted as at 16 upon the clamp plate and is provided with tongues 17 to occupy a position between the seats 18 of the clamp plate to prevent accidental disengagement from said seats of a link of the free end of the side chain which may be fitted therein.

Preferably the side chains consist of links, each of which comprises a single blank or length of wire of a sufficient gage to afford the required strength and stiffness, doubled upon itself and provided with terminal eyes 19 which engage the closed or looped end of the adjoining link, the sides of each link being separated throughout to afford a relatively broad bearing upon the side surface of the tire and at the same time provide an edgewise stiffness which ensures the retention of the transverse or tread elements in proper relation with the tread surface of the tire spanned thereby. As illustrated the chain sections forming the tread elements are composed of closed links 20 constituting broad loops at one end adapted for arrangement parallel with the surface of the tire and loops 21 at the other end disposed perpendicularly to the broad or body loops and adapted as shown for engagement with the broad or body loops of the adjoining links. In practice therefore, the broad or body loops find their proper positions in a flat or contacting relation with the surface of the tire without special attention upon the part of the operator while the perpendicularly disposed loops constitute means for engaging the surface of the road way traversed. These perpendicular loops constitute means preventing skidding and as a means of increasing the tractive effect of the wheel to which the device is applied, and which obviously is of special importance when the chain is used in connection with driving wheels.

The tread elements are detachably connected with the side chains by means of the loops 12 as before described and therefore may be replaced readily when worn or otherwise injured, or may be removed or applied at will to provide for the use of as many tread elements in connection with the side chains as may be required to suit the character of the road surface.

As before noted the clamp preferably consists of a flat plate, one of which is permanently connected with one end of each side chain, and to this end an attaching loop 22 may be applied for engagement at its looped end by the terminal link of the chain, the extremities of said loop being deflected in opposite directions laterally or perpendicularly to the plane of the body of the loop to form studs 23 for respective engagement with openings 24 in the clamp plate. The clamp plate is provided with one or more spaced seats 18 to receive an end link of the chain. The sides of the clamp plate near their lower edges are provided with depressions or recesses 26 to receive inwardly extending spring fingers or lips 25 at the lower ends of tongues 17 of the clasp 15. It is apparent from this construction that when a link has been engaged in one of the seats 18 of the clamp plate and the clasp 15 moved downwardly until the lips 25 engage in recesses 26, the clasp will be held firmly against accidental opening, and the link confined thereby will be held properly in its seat. The free edges of the clamp plate between the link seats 18 may also be tapered or sharpened as indicated at 27 to facilitate the passage thereof between the lips 25 in closing the clasp upon the edge of the clamp plate after the engagement of a link of the side chain in either of the seats 18 of the latter.

From the foregoing description it will be obvious that the several elements of the device may be made with the minimum machine work and with no work in assembling other than that necessary to secure the attaching loop 22 to the clamp plate and the pivoting of the clasp upon said plate, and moreover that those elements which are exposed may be readily replaced without involving disarrangement of any of the other features, and at the same time when the parts are properly related as described, the possibility of detachment or of displacement of the parts relative to the tire is negatived.

Having thus fully described my invention, I claim:—

In a chain link coupling device, an elongated plate employed as a connector and having a pair of openings at one end disposed one near each longitudinal edge of the plate, a link open at one end and having its side portions deflected, the ends of said side portions being turned inwardly and engaged one in each of said openings in the said plate.

In testimony whereof I affix my signature.

ROBERT E. BENSON.